(12) United States Patent
Tashiro

(10) Patent No.: US 8,688,916 B2
(45) Date of Patent: Apr. 1, 2014

(54) STORAGE SYSTEM AND DATA PROCESSING METHOD USING CACHE MEMORY

(75) Inventor: Naomitsu Tashiro, Oi (JP)

(73) Assignees: Hitachi, Ltd., Tokyo (JP); Hitachi Information & Telecommunication Engineering, Ltd., Tokyo (JP)

( * ) Notice: Subject to any disclaimer, the term of this patent is extended or adjusted under 35 U.S.C. 154(b) by 423 days.

(21) Appl. No.: 13/129,272

(22) PCT Filed: Apr. 22, 2011

(86) PCT No.: PCT/JP2011/002385
§ 371 (c)(1),
(2), (4) Date: May 13, 2011

(87) PCT Pub. No.: WO2012/143980
PCT Pub. Date: Oct. 26, 2012

(65) Prior Publication Data
US 2012/0272008 A1    Oct. 25, 2012

(51) Int. Cl.
*G06F 12/06*    (2006.01)
*G06F 12/08*    (2006.01)
*G06F 17/30*    (2006.01)

(52) U.S. Cl.
CPC ...... *G06F 12/0868* (2013.01); *G06F 17/30159* (2013.01)
USPC ............................ 711/129; 711/165; 711/216

(58) Field of Classification Search
CPC ....................... G06F 17/30159; G06F 12/0868
USPC ........................................ 711/129, 165, 216
See application file for complete search history.

(56) References Cited

U.S. PATENT DOCUMENTS

| | | |
|---|---|---|
| 2002/0032671 A1 | 3/2002 | Iinuma |
| 2008/0133835 A1 | 6/2008 | Zhu et al. |
| 2009/0037450 A1* | 2/2009 | Jia et al. ........................ 707/101 |

FOREIGN PATENT DOCUMENTS

| | | |
|---|---|---|
| JP | 2002-91811 A | 3/2002 |
| WO | 2006/039493 A2 | 4/2006 |

\* cited by examiner

*Primary Examiner* — John Lane
(74) *Attorney, Agent, or Firm* — Volpe and Koenig, P.C.

(57) ABSTRACT

A cache memory is utilized effectively because data redundancy elimination is executed. A controller manages the cache memory by dividing it into a first area and a second area. When receiving a write access request from an access requestor, the controller divides a data block, which is an access target, into a plurality of chunks and searches the first area first and then the storage apparatus based on each chunk. If chunk storage information, indicating that each chunk is stored in the storage apparatus, does not exist in the first area or the storage apparatus, the controller executes chunk storage processing and creates and stores the chunk storage information. If the chunk storage information exists, the controller eliminates the chunk storage processing for storing the chunks. If the chunk storage information does not exist in the first area, the controller stages the chunk storage information from the storage apparatus to the first area on condition that the first area has an unused area.

12 Claims, 12 Drawing Sheets

FIG. 3

| OFFSET | CHUNK STORAGE LOCATION |
|---|---|
| OFFSET | CHUNK STORAGE LOCATION |
| ⋮ | ⋮ |
| OFFSET | CHUNK STORAGE LOCATION |

FIG. 4

| HASH VALUE | CHUNK STORAGE LOCATION | CHUNK GROUP ID |
|---|---|---|
| HASH VALUE | CHUNK STORAGE LOCATION | CHUNK GROUP ID |
| ⋮ | ⋮ | ⋮ |
| HASH VALUE | CHUNK STORAGE LOCATION | CHUNK GROUP ID |

STORAGE SYSTEM AND DATA PROCESSING METHOD USING CACHE MEMORY

TECHNICAL FIELD

The present invention relates to a storage system and its data processing method.

BACKGROUND ART

Some conventional file system for a computer temporarily stores files, which have been read from an external storage apparatus such as magnetic disk devices, in a memory, such as a cache memory, within the computer in order to increase the speed of access to the files stored in the external storage apparatus.

As the files which are access targets are retained in the cache memory, when access to the same files occurs, the access can be processed within the computer. Consequently, it is possible to reduce overhead required for the computer to access the external storage apparatus again.

However, since the cache memory has a limited capacity, the cache memory cannot always retain the same files. So, when it is necessary to fetch files, which are not retained in the cache memory, in the cache memory and if an unused area for fetching such files does not exist in the cache memory, the unused area is formed in the cache memory.

For example, if there is no unused area in the cache memory at the time of I/O reception when executing I/O (input/output) processing such as read processing or write processing, a control method of destaging data in the cache memory based on the number of accesses to files and access intervals is suggested (see Patent Literature 1).

CITATION LIST

Patent Literature

PTL 1: Japanese Patent Application Laid-Open (Kokai) Publication No. 2002-91811

SUMMARY OF INVENTION

Technical Problem

If there is no unused area in the cache memory at the time of I/O reception when managing the cache memory, the cache memory can be utilized effectively by destaging data in the cache memory based on, for example, the number of accesses to files.

However, when executing staging processing for migrating data in the storage apparatus to the cache memory or destaging processing for removing data existing in the cache memory, the tendency of access to data used for I/O processing is different from the tendency of access to data used for redundancy elimination processing, so that even if the method described in Patent Literature 1 is simply applied upon the I/O processing, the cache memory cannot be utilized effectively in order to realize the redundancy elimination processing for eliminating redundant storage of the same data in the storage apparatus.

The present invention was devised in light of the problems of the conventional technology and it is an object of the invention to provide a storage system and its data processing method capable of effectively utilizing a cache memory because data redundancy elimination is executed.

Solution to Problem

The present invention provides a storage system including a cache memory having a first area and a second area, a storage apparatus for storing data, and a controller for controlling I/O processing on the cache memory or the storage apparatus based on an access request from an access requestor in order to achieve the above-described object, wherein the controller manages the first area as a storage area for storing redundancy elimination information and manages the second area as a storage area for storing data; when receiving a write access request from the access requestor, the controller searches the first area first and then the storage apparatus and judges whether or not data storage information, indicating that data requested by the access request is stored in the storage apparatus, exists in the first area or the storage apparatus; and if a negative result is obtained for the judgment, the controller stores the data requested by the access request in the storage apparatus, creates the data storage information and stores it in the storage apparatus; and if an affirmative result is obtained for the judgment, the controller eliminates the processing for storing the data requested by the access request in the storage apparatus; and if the data storage information does not exist in the first area, the controller stages the data storage information from the storage apparatus to the first area at least on condition that the first area has an unused area. When storing the data requested by the access request in the storage apparatus, identification information for identifying data stored in the storage apparatus and location information indicating a data storage location of the data stored in the storage apparatus can be created as the data storage information.

Advantageous Effects of Invention

According to the present invention, the cache memory can be utilized effectively because data redundancy elimination is executed.

BRIEF DESCRIPTION OF DRAWINGS

FIG. 3 is a configuration diagram of file configuration information.

FIG. 4 is a configuration diagram of chunk index information.

DESCRIPTION OF EMBODIMENTS

Concept of Invention

Figure 1:
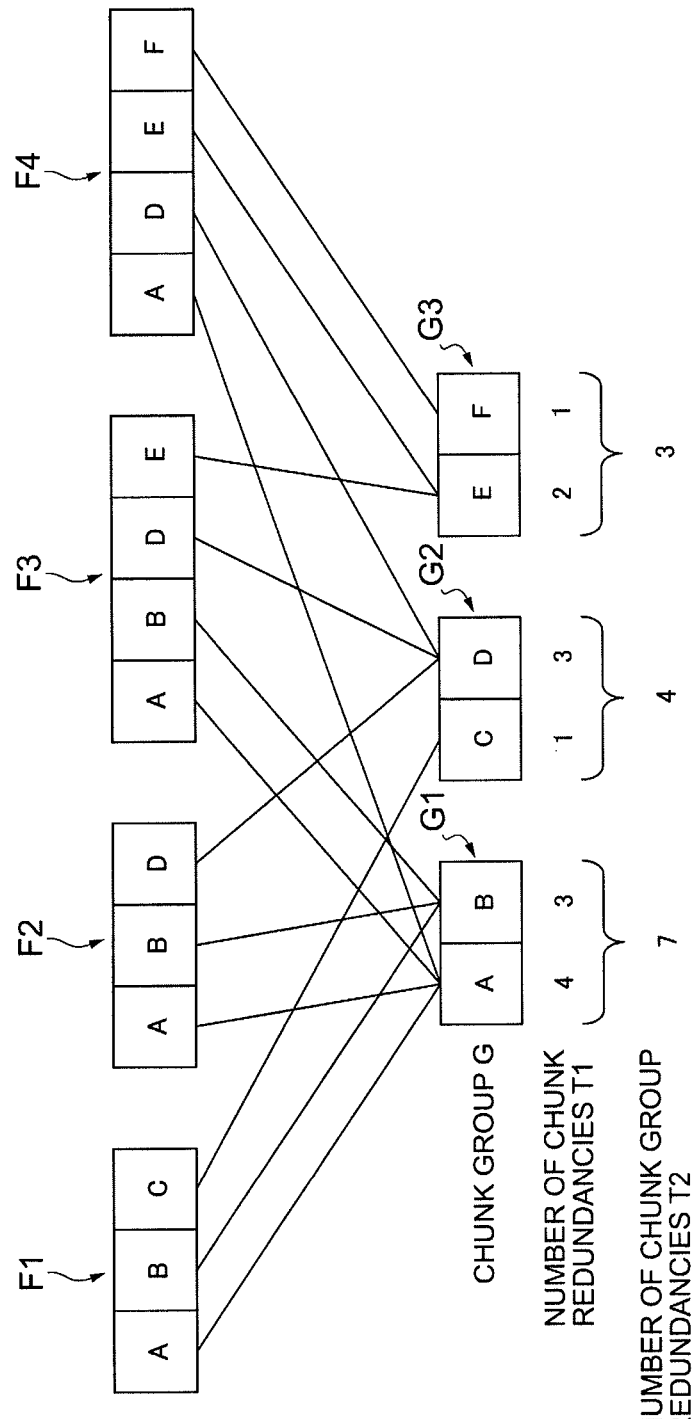
FIG. 1 is a schematic diagram of a system for explaining the concept of the invention.

FIG. 1 shows a schematic diagram of a system for explaining the concept of the present invention.

Referring to FIG. 1, if data blocks are updated over a plurality of generations, for example, if a first-generation data block F1 is updated to a second-generation data block F2, a third-generation data block F3, and a fourth-generation data block F4, each data block can be managed by dividing it into a plurality of data sub-blocks (the data sub-blocks will be hereinafter sometimes referred to as chunks).

For example, the data block F1 can be divided into a plurality of chunks A, B, C; the data block F2 can be divided into a plurality of chunks A, B, D; the data block F3 can be divided into a plurality of chunks A, B, D, E; and the data block F4 can be divided into a plurality of chunks A, D, E, F.

Under this circumstance, the plurality of chunks belonging to each data block can be divided into a plurality of chunk groups by using the chunks constituting areas adjacent to each other.

In this case, if redundancy elimination for eliminating redundant storage of the same chunks in the storage apparatus (not shown in the drawing) is applied to each data block, the effect of the redundancy elimination is particularly high in the data blocks of different generations. Moreover, since the order of chunks constituting the data blocks of a plurality of generations, on which the redundancy elimination can be executed, is often common in the plurality of generations, the chunks can be divided into a plurality of chunk groups by focusing on the above-described characteristic.

For example, the data block F2 is composed of the chunks A, B, D and has the chunks A, B from among the chunks A, B, C of the pre-update data block F1; and the order of the chunks A, B is common in the data blocks F1, F2. In consideration of this fact, a chunk group G1 can be constituted from the chunks A, B.

On the condition that each chunk group should be composed of two chunks, when the chunks belonging to the data blocks F1 to F4 are to be divided into a plurality of chunk groups, the chunk group G1 can be composed of the chunks A, B and then a chunk group G2 can be composed of the chunks C, D and a chunk group G3 can be composed of the chunks E, F.

When managing the number of chunk redundancies T1 indicating the number of times the data blocks refer to each chunk (hereinafter sometimes simply referred to as the number of redundancies) under the above-described circumstance, each data block F1, F2, F3, F4 refers to the chunk A belonging to the chunk group G1 once, so that the number of chunk redundancies T1 of the chunk A is 4. Also, each data block F1, F2, F3 refers to the chunk B belonging to the chunk group G1 once, so that the number of chunk redundancies T1 of the chunk B is 3. In this case, the number of chunk group redundancies T2 indicating a total value of the number of chunk redundancies of the entire chunk group G1 is 7.

On the other hand, the data block F1 refers to the chunk C belonging to the chunk group G2 only once, so that the number of chunk redundancies T1 of the chunk C is 1. Each data block F2, F3, F4 refers to the chunk D belonging to the chunk group G2 once, so that the number of chunk redundancies T1 of the chunk D is 3. In this case, the number of chunk group redundancies T2 of the chunk group G2 is 4.

Each data block F3, F4 refers to the chunk E belonging to the chunk group G3 once, so the number of chunk redundancies T1 of the chunk E is 2. The data block F4 refers to the chunk F belonging to the chunk group G3 only once, so that the number of chunk redundancies T1 of the chunk F is 1. In this case, the number of chunk group redundancies T2 of the chunk group G3 is 3.

Then, a cache memory (not shown in the drawing) is divided into a first area and a second area; the first area is managed as a storage area for storing cache information used for chunk redundancy elimination processing or data redundancy elimination processing and the second area is managed as a storage area for storing data; and a controller for controlling I/O processing on the storage apparatus is prepared.

When receiving a write access request from an access requestor under the above-described circumstance, the controller searches the first area of the cache memory first and then the storage apparatus and judges whether or not chunk group information, indicating that the chunks belonging to a data block requested by the access request are stored in the storage apparatus on a group basis, exists in the first area or the storage apparatus; and if the information does not exist, the controller executes chunk storage processing for storing the chunks belonging to the data block requested by the access request in the storage apparatus and stores, in the storage apparatus, chunk information including hash values for identifying the chunks belonging to the data block requested by the access request and location information indicating chunk storage locations of the chunks, as information belonging to the chunk group information.

On the other hand, if the chunk group information exists in the first area or the storage apparatus, the controller eliminates the chunk storage processing, thereby preventing the same chunks being redundantly stored in the storage apparatus; and if the chunk group information does not exist in the first area, the controller stages the chunk group information including the chunk information from the storage apparatus to the first area at least on condition that the first area has an unused area.

If the data block F2 is to be stored in a state where the data block F1 is stored, the chunk group information of the chunk group G1 is stored in the first area during the process of processing the chunk A of the data block F2. Subsequently, when processing the chunk B of the data block F2, the chunk B becomes a target of the redundancy elimination because the chunk group information of the chunk group G1 already exists in the first area, so that the chunk B can be prevented from being redundantly stored in the storage apparatus and the cache memory can be utilized effectively because the chunk redundancy elimination is executed.

Furthermore, if the first area is full when storing the chunk group information in the first area, a small value of a cache operation point based on the number of chunk group redundancies T2 indicates low access tendency, so that an unused area can be formed in the first area by destaging the chunk group information corresponding to a chunk group, whose value of the cache operation point is small, from the first area.

Furthermore, if the data requested by the write access request from the access requestor is managed as one piece of processing target data without dividing it into a plurality of data sub-blocks, the controller can use the configuration described below.

For example, when receiving a write access request from the access requestor, the controller searches the first area of the cache memory first and then the storage apparatus and judges whether or not data storage information, indicating that data requested by the access request is stored in the storage apparatus, exists in the first area or the storage apparatus; and if the information does not exist, the controller executes data storage processing for storing the data requested by the access request in the storage apparatus and stores, in the storage apparatus, data management information including identification information for identifying the data requested by the access request and location information indicating a storage location of the data requested by the access request, as information belonging to the data storage information; and if the information exists, the controller eliminates the chunk storage processing; and if the information does not exist in the first area, the controller stages the data storage information including the data management information from the storage apparatus to the first area at least on condition that the first area has an unused area.

Embodiments

This embodiment is designed so that a cache memory is managed by dividing it into a first area and a second area; and when receiving a write access request from an access requestor to access a target file, the access target file is divided into a plurality of chunks and the first area is searched first and then the storage apparatus is searched based on each chunk; and if chunk storage information, indicating that each chunk is stored in the storage apparatus, does not exist in the first area or the storage apparatus, chunk storage processing is executed and the chunk storage information is created and stored; and if the chunk storage information exists, the chunk storage processing for storing the chunks is eliminated; and if the chunk storage information does not exist in the first area, the chunk storage information is staged from the storage apparatus to the first area on condition that the first area has an unused area.

Overall Configuration

Figure 2:
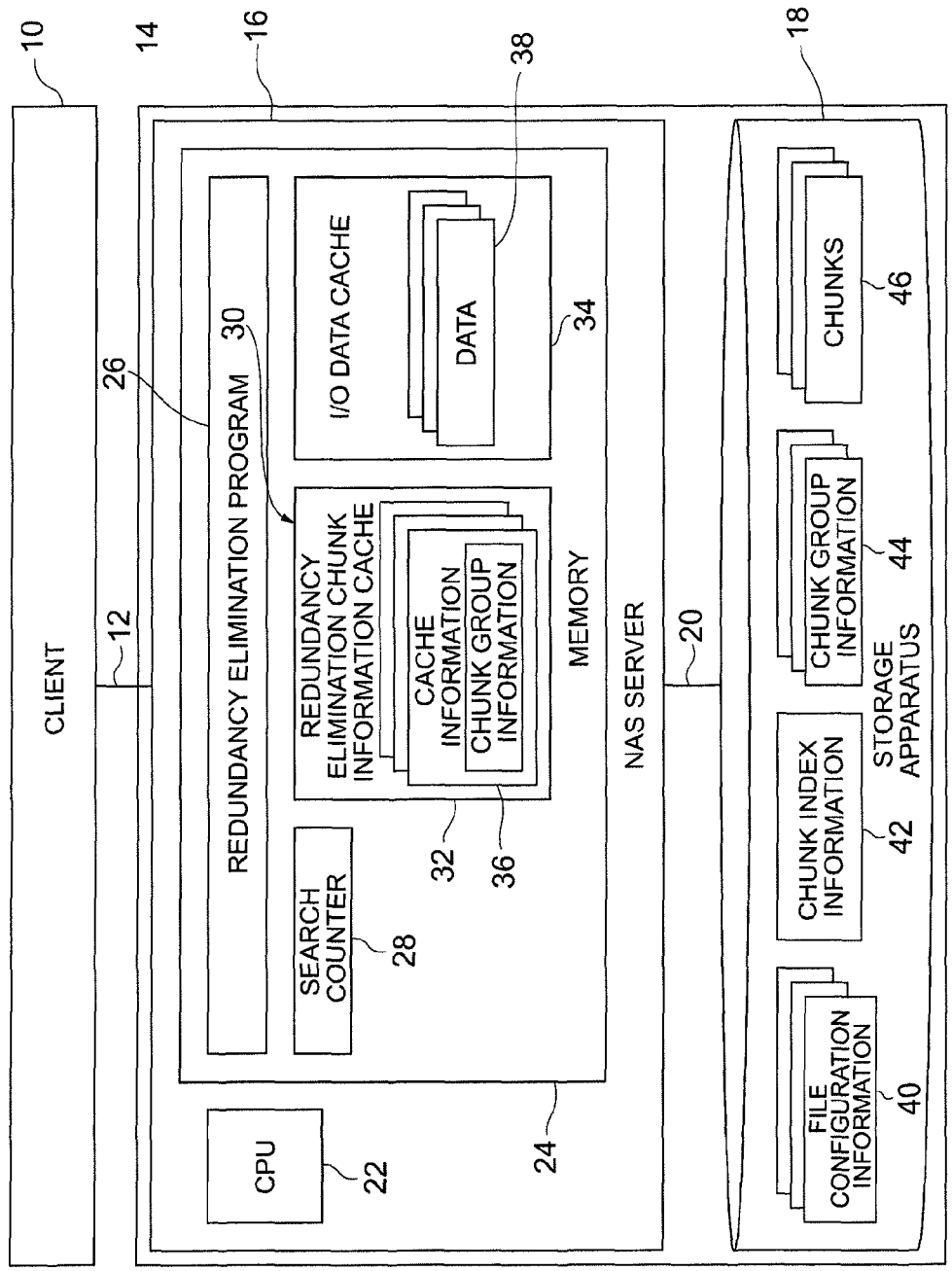
FIG. 2 is a block configuration diagram of a computer system to which the present invention is applied.

Next, FIG. 2 shows a block configuration diagram of a computer system to which the present invention is applied. Referring to FIG. 2, the computer system includes a client terminal (hereinafter sometimes referred to as the client) 10, a network 12, and a storage system 14.

The client 10 is a computer device equipped with information processing resources such as a CPU (Central Processing Unit), a memory, and an input/output interface. The client 10 can access logical volumes provided by the storage system 14 by sending an access request, for example a write request or a read request, which designates the logical volumes, to the storage system 14.

As the network 12, for example, an FC SAN (Fibre Channel Storage Area Network), an IP SAN (Internet Protocol Storage Area Network), a LAN (Local Area Network), and a WAN (Wide Area Network) can be used.

The storage system 14 includes a file server 16 and a storage apparatus 18 and the file server 16 and the storage apparatus 18 are connected via an internal network 20.

The file server 16 is configured as a controller having a CPU 22, which functions as a processor for supervising and controlling the entire file server 16, and a memory 24; and can be used as, for example, a NAS (Network Attached Storage) server.

A redundancy elimination program 26 for executing data or chunk redundancy elimination processing is stored in the memory 24, and a search counter 28 for counting the number of times chunk redundancy judgment processing is executed, and a cache memory 30 are configured in the memory 24.

The cache memory 30 includes a first area 32 and a second area 34. The first area 32 is configured as a cache area for storing redundancy elimination chunk information and a plurality of cache information storage areas 36 are formed in the first area 32.

The second area 34 is configured as a cache area for temporarily storing data associated with I/O processing by the CPU 22 and a plurality of data storage areas 38 are formed in the second area 34.

The storage apparatus 18 is composed of a plurality of storage devices, for example, HDDs (Hard Disk Drive). A file system is configured in a storage area composed of one or more storage devices; and a plurality of file configuration information storage areas 40 for storing file configuration information, a chunk index information storage area 42 for storing chunk index information, a plurality of chunk group information storage areas 44 for storing chunk group information, and a plurality of chunk storage areas 46 for storing chunks are formed.

If HDDs are used as the storage devices, for example, FC (Fibre Channel) disks, SCSI (Small Computer System Interface) disks, SATA (Serial ATA) disks, ATA (AT Attachment) disks, and SAS (Serial Attached SCSI) disks can be used.

Besides HDD, for example, semiconductor memory devices, optical disk devices, magneto-optical disk devices, magnetic tape devices, and flexible disk devices can be used as the storage devices.

Next, FIG. 3 shows a configuration diagram of the file configuration information.

Referring to FIG. 3, file configuration information 100 is one piece of information existing for each file and indicating where chunks constituting each file are stored. The file configuration information 100 corresponding to each file is stored in any of the file configuration information storage areas 40.

Each piece of file configuration information 100 includes offset 102 and a chunk storage location 104 as information for managing the chunks constituting each file.

The offset 102 is information indicating the location of a top of the relevant chunk in the relevant file. The chunk storage location 104 is information indicating the actual storage location of the relevant chunk and, for example, a file name and a block address are used as this information.

For example, if the file F1 shown in FIG. 1 is managed as a file, an entry 110 stores, for example, 0 as the offset of the chunk A. If the length of the chunk A is 4096, an entry 112 stores 4096 as the offset of the chunk B. Also, the chunk storage location 104 in the entry 110 stores, for example, the file name and the block address as information indicating the storage location of the chunk A and the chunk storage location 104 in the entry 112 stores, for example, the file name and the block address as information indicating the storage location of the chunk B.

Next, FIG. 4 shows a configuration diagram of chunk index information.

Referring to FIG. 4, one piece of chunk index information 200 exists in the storage system 14, is information indicating where the chunks corresponding to hash values are stored, and is stored in the chunk index information storage area 42.

The chunk index information 200 includes a hash value 202, a chunk storage location 204, and a chunk group ID 206. Regarding the hash value 202, a hash value obtained from data of the entire chunk or data of part of the chunk is used. An entry 210 stores, for example, a hash value of the chunk A and an entry 212 stores a hash value of the chunk B.

The chunk storage location 204 is information indicating the actual storage location of the relevant chunk and, for example, a file name and a block address are used as this information.

The chunk group ID 206 is information about the ID (Identifier) of a chunk group to which the relevant chunk belongs. For example, if the chunks A, B constituting the file F1 shown in FIG. 1 form the chunk group G1, the chunk group ID 206 in each entry 210, 212 stores G1 information.

Figure 5:
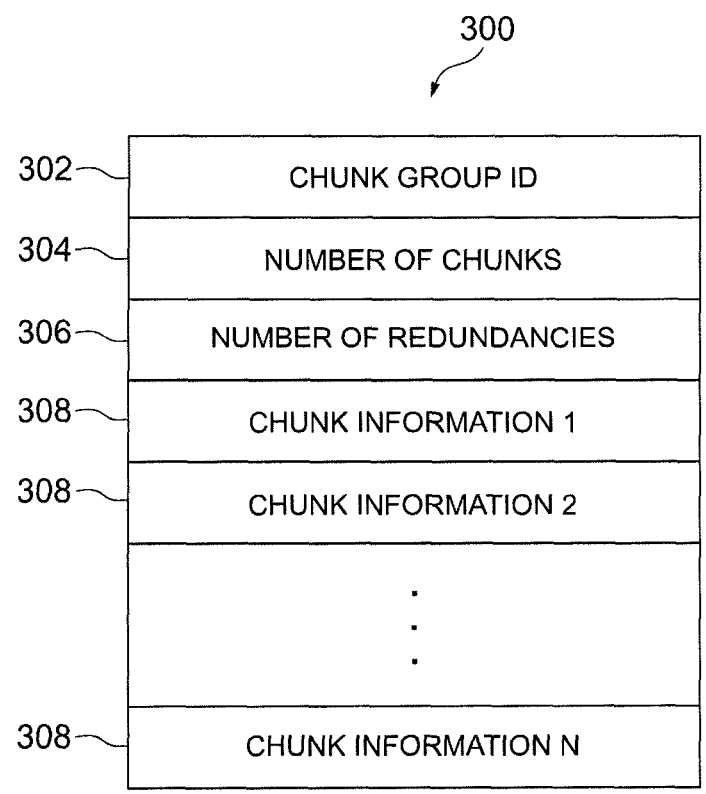
FIG. 5 is a configuration diagram of chunk group information.

FIG. 5 shows a configuration diagram of chunk group information.

Referring to FIG. 5, one piece of chunk group information 300 exists for each chunk group, is chunk storage information (data storage information) for managing each chunk on a group basis, and is stored in any of the chunk group information storage areas 44.

The chunk group information 300 corresponding to each chunk group includes a chunk group ID 302, the number of chunks 304, the number of redundancies 306, and chunk information #1 to #n 308.

The chunk group ID 302 is information about the ID of a chunk group to which each chunk belongs.

The number of chunks 304 is information indicating the number of chunks in the relevant chunk group to which each chunk belongs.

The number of redundancies (which is sometimes referred to as the number of chunk redundancies) 306 is information indicating a total number of times files refer to each chunk belonging to the relevant chunk group.

The chunk information #1 to #n 308 is composed of a hash value of each chunk and information indicating a chunk storage location of each chunk. For example, if the chunk group G1 is composed of the chunks A, B, the chunk information #1 308 stores the hash value of the chunk A and the chunk storage location of the chunk A and the chunk information #2 308 stores the hash value of the chunk B and the chunk storage location of the chunk B.

Figure 6:
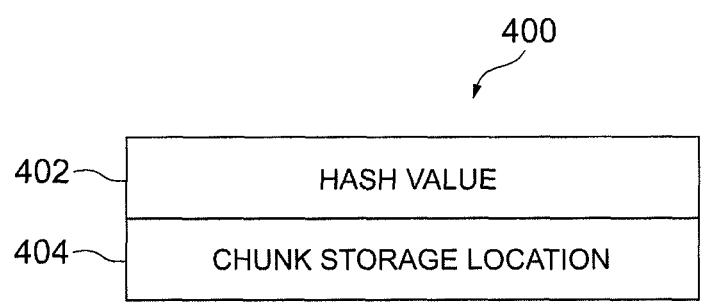
FIG. 6 is a configuration diagram of chunk information.

Next, FIG. 6 shows a configuration diagram of chunk information.

Referring to FIG. 6, chunk information 400 is information stored, together with the chunk group information 300, in any of the chunk group information storage areas 44; one piece of chunk information 400 exists for each chunk; and the chunk information is information for managing necessary information for the chunk redundancy judgment processing.

The chunk information 400 corresponding to each chunk includes a hash value 402 and a chunk storage location 404. The hash value 402 stores information about the hash value of each chunk and the chunk storage location 404 stores, for example, a file name and a block address as information indicating the storage location of each chunk.

Figure 7:
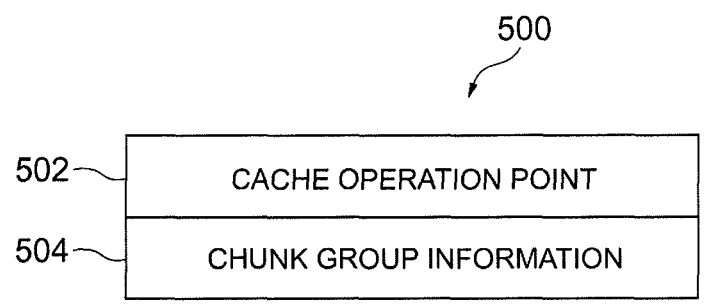
FIG. 7 is a configuration diagram of cache information.

Next, FIG. 7 shows a configuration diagram of cache information.

Referring to FIG. 7, cache information 500 is information stored in the cache information storage area 36 of the first area 32 in the cache memory 30; one piece of cache information 500 exists for each cache information storage area 36; and the cache information 500 is information for managing the chunk group information 300 in the cache memory 30.

The cache information 500 includes a cache operation point 502 and chunk group information 504.

The cache operation point 502 is information used to judge whether or not the chunk group information 300 should be retained in the cache memory 30. This cache operation point 502 stores, as an initial value, a value of the number of chunk group redundancies indicating the number of redundancies of the relevant chunk group.

The configuration of the chunk group information 504 is the same as that of the chunk group information 300. When the chunk group information 300 stored in the storage apparatus 18 is staged (copied) from the storage apparatus 18 to the first area 32, the content of the chunk group information 300 (information registered in the chunk group ID 302, the number of chunks 304, the number of redundancies 306, and the chunk information #1 to #n 308 from among the chunk group information 300) is reflected without any change in the chunk group information 504. Incidentally, when the chunk group information 504 is destaged, the content of the chunk group information 300 is deleted from the chunk group information 504.

Next, data write processing will be explained with reference to a flowchart in FIG. 8.

This processing is started when the CPU 22 receives a write access request as an access request from the client 10.

Firstly, when receiving a file as a target of the write access request from the client 10, for example, when receiving the file F1 shown in FIG. 1, the CPU 22 sequentially divides a data group constituting the file F1 into a plurality of chunks A, B, C (S11); calculates a hash value of each chunk A, B, C (S12); refers to the cache information 500 stored in the cache information storage area 36 and the chunk index information 200 stored in the storage apparatus 18 based on the hash value of each chunk A, B, C, and executes the chunk redundancy judgment processing (S13).

Next, the CPU 22 judges whether the redundancy exists or not, based on the processing result of the chunk redundancy judgment processing (S14). Specifically speaking, the CPU 22 judges whether or not the hash value of each chunk exists in the chunk group information 504 constituting the cache information 500 or the chunk index information 200.

If the files F1 to F4 shown in FIG. 1 are to be sequentially processed, the chunks A, B, C are not stored in the storage apparatus 18 yet during the process of processing the file F1, so that none of the hash values of the chunks A, B, C exists in either the chunk group information 504 or the chunk index information 200. Therefore, during the process of processing the file F1, the CPU 22 determines in step S14 that there is no redundancy; and sequentially executes the chunk storage processing for storing each chunk A, B, C, in the chunk storage area 46 of the storage apparatus 18 (S15).

Next, the CPU 22 registers the hash value 402 of each chunk A, B, C and the chunk storage location 404 of each chunk A, B, C on a chunk basis in the chunk information 400 belonging to the chunk group information 300 stored in the chunk group information storage area 44 (S16); adds 1 to the number of chunks 304 of the chunk group information 300, to which each chunk belongs, on a chunk basis (S17); and registers the hash value 202 of each chunk A, B, C, the chunk storage location 204 of each chunk A, B, C, and the chunk group ID 206 of each chunk A, B, C in the chunk index information 200 on the chunk basis (S18).

Subsequently, the CPU 22 adds 1 to the number of redundancies 306 of the chunk group information 300 on the chunk basis (S19); registers the offset 102 of each chunk A, B, C and the chunk storage location 104 of each chunk A, B, C in the file configuration information 100 (S20); and judges whether any remaining data exists or not (S21). If any remaining data exists, the CPU 22 returns to step S11 and repeats the processing of steps S11 to S21; and if no remaining data exists, the CPU 22 terminates the processing in this routine.

On the other hand, if it is determined in step S14 that the redundancy exists, that is, the hash value of the chunk exists in the chunk group information 504 or the chunk index information 200, the CPU 22 executes the processing of steps S19 to S21.

For example, in a case of processing the chunks A, B of the file F2 shown in FIG. 1 or a case of processing the chunks A, B, D of the file F3, the CPU 22 determines in step S14 that the redundancy exists.

If it is determined in step S14 that no redundancy exists, the CPU 22 prioritizes selection of the chunk group information 300 corresponding to the chunk group, to which a recently accessed chunk belongs, when registering the chunk information 400 corresponding to each chunk in any of the chunk group information 300.

For example, during the process of sequentially updating the processing target file from the file F1 to the file F2, F3, F4, on the condition that two chunks belongs to one chunk group, the chunk information 400 corresponding to the chunks A, B is selected for the chunk group information 300 corresponding to the chunk group G1, the chunk information 400 corresponding to the chunks C, D is selected for the chunk group information 300 corresponding to the chunk group G2, and the chunk information 400 corresponding to the chunks E, F is selected for the chunk group information 300 corresponding to the chunk group G3.

Next, the chunk redundancy judgment processing will be explained with reference to the flowchart in FIG. 9.

Figure 8:
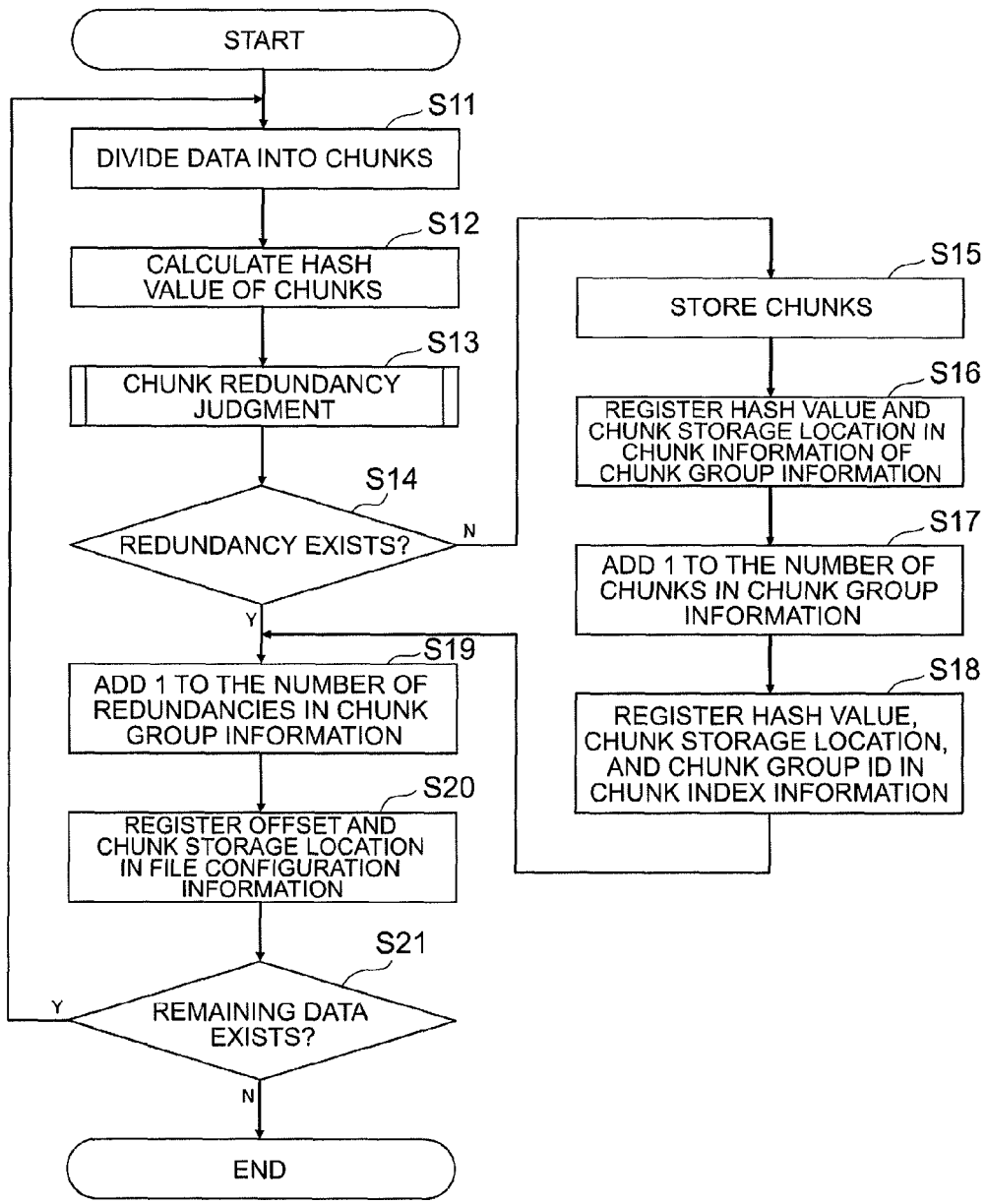
FIG. 8 is a flowchart explaining data write processing.

This processing is the specific content of step S13 in FIG. 8 and is started when the CPU 22 activates the redundancy elimination program 26.

Firstly, after starting the chunk redundancy judgment processing, the CPU 22 adds 1 to a count value of the search counter 28 (S31). Subsequently, for example, in a case of the chunk A constituting the file F1, the CPU 22 searches the cache information 500, using the hash value of the chunk A as a key (S32) and judges whether or not the hash value of the chunk A exists in the chunk group information 504 belonging to the cache information 500, that is, whether or not the hash value of the chunk A exists in the first area 32 (S33).

Incidentally, in a case where the files F1 to F4 are targets to be processed, the chunk redundancy judgment processing will be executed on the chunks constituting each file. Now, the chunk redundancy judgment processing will be explained with respect to the case of the chunk A constituting the file F1.

If it is determined in step S33 that the hash value of the chunk A does not exist, that is, the hash value of the chunk A does not exist in the chunk group information 504, the CPU 22 searches the chunk index information 200, using the hash value of the chunk A as a key (S34) and judges whether or not the hash value of the chunk A exists in the chunk index information 200 (S35). If the hash value of the chunk A does not exist in the chunk index information 200, the CPU 22 recognizes as the judgment result that no redundancy exists, thereby terminating the processing in this routine.

On the other hand, if it is determined in step S35 that the hash value of the chunk A exists, the chunk A is already stored in the storage apparatus 18, so that the CPU 22 executes processing for staging the chunk group information 300 corresponding to the chunk group G1, to which the chunk A belongs, to the first area 32 in the cache memory 30 (S36) and recognizes as the judgment result that the redundancy exists, thereby terminating the processing in this routine.

If it is determined in step S33 that the hash value of the chunk A exists in the first area 32, the CPU 22 recognizes as the judgment result that the redundancy exists, thereby terminating the processing in this routine.

Incidentally, if the chunks A, B, C of the file Fl are processed in step S33, it is determined that no hash value exists with respect to all the chunks A, B, C; and if the chunks A, B, D of the file F2 are processed, it is determined that no hash value exists with respect to the chunks A, D. However, regarding the chunk B, the chunk group information 300 about the chunk group G1 is staged from the storage apparatus 18 to the first area 32 in step 36 during the process of processing the chunk A of the file F2, so it is determined that the hash value of the chunk B exists.

Therefore, in the case of processing the chunks A, B, D of the file F2 (for example, the chunk redundancy judgment processing), the processing of the chunk B of the file F2 can be executed more promptly than the processing of the chunk A of the file F2.

Specifically speaking, when each chunk is stored in the storage apparatus 18, the CPU 22 registers information including the hash value 202 of each chunk, the chunk storage location 204 of each chunk, and the chunk group ID 206 of a chunk group, to which each chunk belongs, in the chunk index information 200. Subsequently, during the process of executing the chunk redundancy judgment processing on one chunk in a plurality of chunks belonging to the same chunk group from among groups of chunks registered in the chunk index information 200, the CPU 22 searches the chunk index information 200. If the chunk group information 300, in which that one chunk is registered, is staged from the storage apparatus 18 to the first area 32 based on the above search result, the chunk group information 300 which has been staged from the storage apparatus 18 to the first area 32 can be utilized during the process of executing the chunk redundancy judgment processing on other chunks belonging to the same chunk group. Therefore, the chunk redundancy judgment processing can be executed promptly.

Next, the chunk group information staging processing will be explained with reference to the flowchart in FIG. 10.

Figure 9:
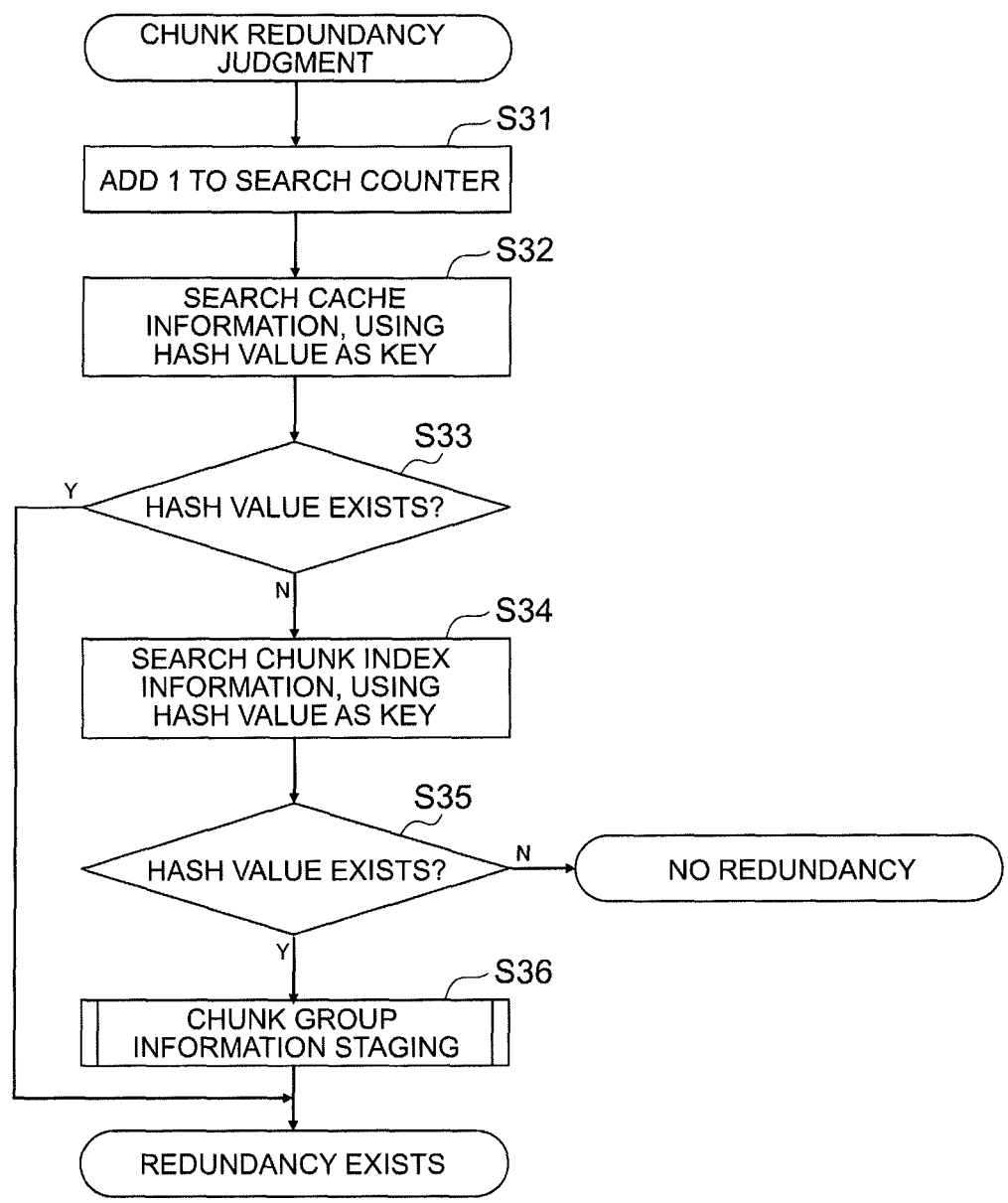
FIG. 9 is a flowchart explaining chunk redundancy judgment processing.

This processing is the specific content of step S36 in FIG. 9.

The CPU 22 judges whether the cache area is full or not (S41). Specifically speaking, the CPU 22 judges whether or not an unused area exists in the cache information storage area 36 of the first area 32. If an unused area exists in the cache information storage area 36 of the first area 32, the CPU 22 proceeds to processing of step S44; and if it is determined that the cache information storage area 36 of the first area 32 is full, the CPU 22 executes the chunk group information destaging processing (S42).

Subsequently, the CPU 22 judges whether the chunk group information 500 existing in the first area 32 is destaged or not (S43). If the chunk group information 504 is not destaged, the CPU 22 terminates the processing in this routine.

On the other hand, if any of the chunk group information 504 is destaged from the first area 32 (if the chunk group information 504 is deleted from the first area 32), the CPU 22 recognizes that an unused area exists in the first area 32; stages the chunk group information 300 existing in the storage apparatus 18 to the first area 32; reflects the content of the chunk group information 300 in the chunk group information 504 by, for example, copying the content of the chunk group information 300 to the chunk group information 504; and creates the cache information 500 based on the chunk group information 504 in which the content of the chunk group information 300 is reflected (S44), thereby terminating the processing in this routine.

When creating the cache information 500 from the chunk group information 300 in step S44, the CPU 22 sets, as an initial value, the number of redundancies 306 of the chunk group information 300 to the cache operation point 502 of the cache information 500.

Next, another chunk group information staging processing will be explained with reference to the flowchart in FIG. 11.

This processing is the specific content of step S36 in FIG. 9.

Firstly, the CPU 22 calculates a coefficient of the chunk group information 300 for managing each chunk on a group basis (S51) and judges whether or not the coefficient is equal to or more than the threshold (S52). If it is determined in step S52 that the coefficient is less than the threshold, the CPU 22 removes the chunk group information 300 for managing the chunks from the target to be staged, thereby terminating the processing in this routine.

If it is determined in step S52 that the coefficient is equal to or more than the threshold, the CPU 22 recognizes the chunk group information 300 for managing the chunks as the target to be staged and proceeds to processing of step S53.

The coefficient herein used is defined by the following formula:

Coefficient=Number of Redundancies/Number of Chunks/Number of Already Stored Files Number of Redundancies/Number of Chunks in the above-mentioned formula means the number of redundancies per chunk belonging to a chunk group.

The threshold is a criterion value to judge whether or not the chunk group information 300 which is the target to be staged should be staged from the storage apparatus 18 to the first area 32. A value adjusted according to the system so that the effect of staging the chunk group information 300 from the storage apparatus 18 to the first area 32 would exceed the effect of not staging the chunk group information 300 from the storage apparatus 18 to the first area 32 is used as the above-described threshold.

For example, a desirable threshold would be a value that will make I/O processing time in a case where the chunk group information 300 is staged from the storage apparatus 18 to the first area 32 becomes shorter than I/O processing time in a case where the chunk group information 300 is not staged from the storage apparatus 18 to the first area 32.

On the other hand, the CPU 22 judges whether the cache area is full or not in step S53. Specifically speaking, the CPU 22 judges whether or not an unused area exists in the cache information storage area 36 of the first area 32; and if an unused area exists in the cache information storage area 36 of the first area 32, the CPU 22 proceeds to processing of step S56; and if it is determined that the cache information storage area 36 of the first area 32 is full, the CPU 22 executes chunk group information destaging processing (S54).

Subsequently, the CPU 22 judges whether the chunk group information 500 existing in the first area 32 is destaged or not (S55); and if the chunk group information 504 is not destaged, the CPU 22 terminates the processing in this routine.

On the other hand, if any of the chunk group information 504 is destaged from the first area 32 (if the chunk group information 504 is deleted from the first area 32), the CPU 22 recognizes that an unused area exists in the first area 32; stages the chunk group information 300 existing in the storage apparatus 18 to the first area 32; reflects the content of the chunk group information 300 in the chunk group information 504 by, for example, copying the content of the chunk group information 300 to the chunk group information 504; and creates the cache information 500 based on the chunk group information 504 in which the content of the chunk group information 300 is reflected (S56), thereby terminating the processing in this routine.

When creating the cache information 500 from the chunk group information 300 in step S56, the CPU 22 sets, as an initial value, the number of redundancies 306 of the chunk group information 300 to the cache operation point 502 of the cache information 500.

Regarding the above-described processing, the speed of processing regarding the chunks managed by the chunk group information 300 which is removed from the target to be staged can be increased by removing the chunk group information 300, for which the coefficient is less than the threshold, from the target to be staged. Specifically speaking, the tendency of access to the chunks managed by the chunk group information 300, which is removed from the target to be staged, is lower than the tendency of access to the chunks managed by the chunk group information 300 which is the target to be staged. So, the processing speed when reference is made to the chunk group information 300 existing in the storage apparatus 18 is faster than the processing speed when the chunk group information 300 is staged from the storage apparatus 18 to the first area 32 and reference is made to the chunk group information 300 which has been staged to the first area 32.

Next, the chunk group information destaging processing will be explained with reference to the flowchart in FIG. 12.

Figure 10:
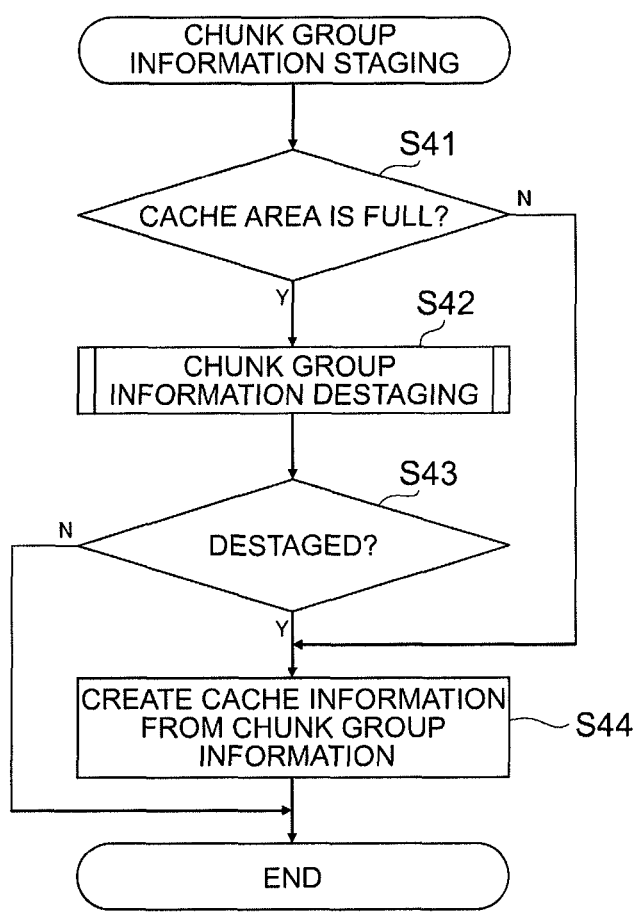
FIG. 10 is a flowchart explaining chunk group information staging processing.
Figure 11:
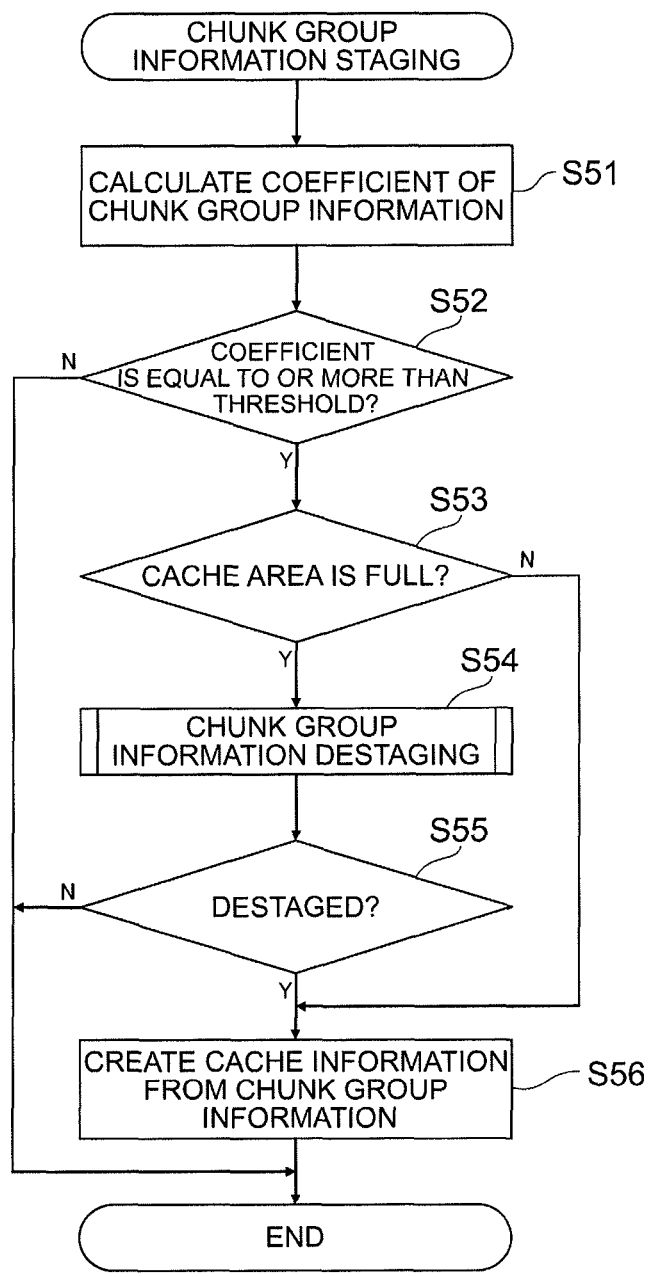
FIG. 11 is a flowchart explaining another chunk group information staging processing.

This processing is the specific content of step S42 in FIG. 10 or step S54 in FIG. 11.

The CPU 22 obtains the number of redundancies 306 of the chunk group information 300, which is the target to be staged, and recognizes the obtained number of redundancies 306 as X (S61); updates the cache operation points (S62); obtains a minimum value Y of the cache operation points 502 from all the pieces of the cache information 500 existing in the first area 32 (S63); and judges whether or not the number of redundancies X is more than the minimum value Y of the cache operation point (S64).

If it is determined in step S64 that the number of redundancies X is more than the minimum value Y of the cache operation point, the CPU 22 recognizes that the chunk group information 300 which is the target to be staged is more valuable and useful than the chunk group information 504 corresponding to the minimum value Y of the cache operation point; recognizes the chunk group information 504, whose cache operation point is the minimum value Y, as the chunk group information 504 which is the target to be destaged, and destages the chunk group information 504 which is the target to be destaged (S65); and obtains the processing result affirming the execution of destaging, thereby terminating the processing in this routine.

On the other hand, if the CPU 22 determines that the number of redundancies X is less than the minimum value Y of the cache operation point, the chunk group information 300 which is the target to be staged is less valuable and useful than other chunk group information 504 existing in the first area 32 and it is unnecessary to select the chunk group information 504 which should be the target to be destaged, from among other chunk group information 504. So, the CPU 22 obtains the processing result negating the execution of destaging, thereby terminating the processing in this routine.

Figure 13:
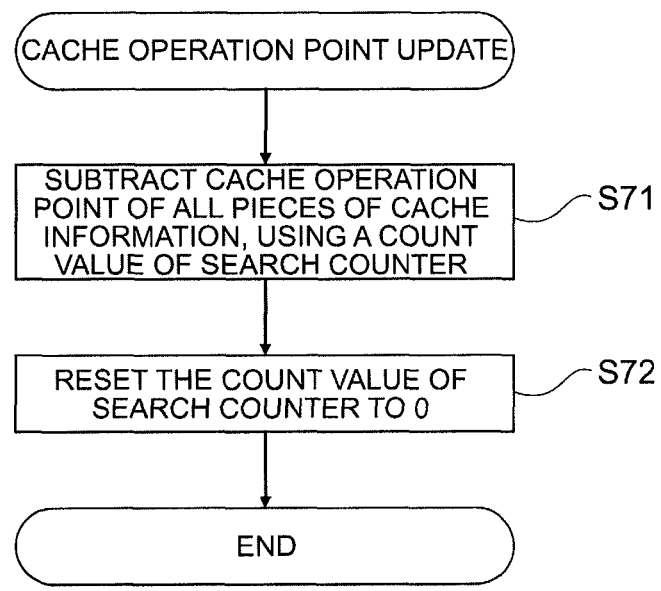
FIG. 13 is a flowchart explaining cache operation point update processing.

Next, the cache operation point update processing will be explained with reference to the flowchart in FIG. 13.

Figure 12:
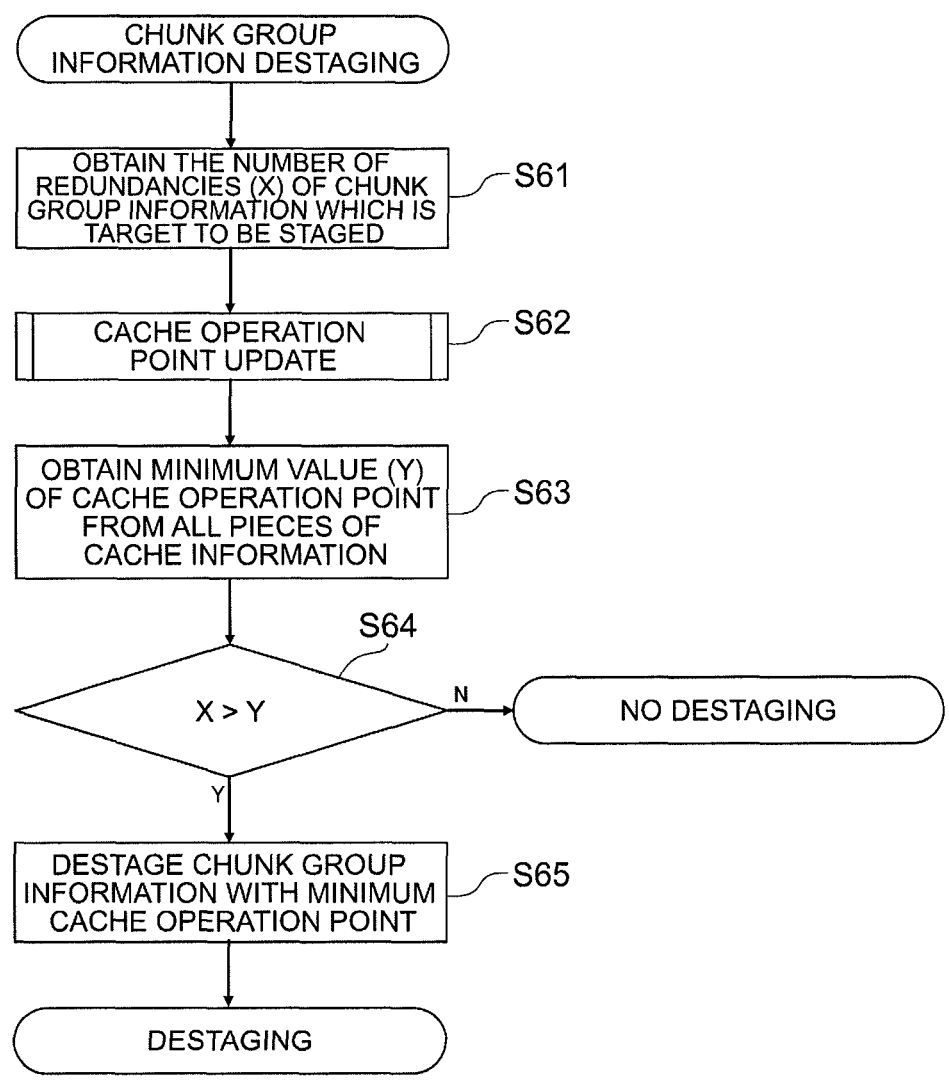
FIG. 12 is a flowchart explaining chunk group information destaging processing.

This processing is the specific content of step S62 in FIG. 12.

The CPU 22 subtracts a count value of the search counter 28 (a total number of times of execution of the redundancy judgment processing on each chunk) from the cache operation points 502 of all the pieces of cache information 500 existing in the first area 32 (S71); updates the values of the cache operation points 502 in all the pieces of cache information 500 based on each subtraction result; uses the minimum value of the updated cache operation points 502 as the minimum value Y in the processing of step S63 in FIG. 12; and then resets the count value of the search counter 28 to 0 (S72), thereby terminating the processing in this routine.

Incidentally, if the redundancy judgment processing on each chunk constituting a file is started after resetting the count value to 0, the search counter 28 executes processing for incrementing the count value by 1 every time the redundancy judgment processing is executed on each chunk.

Furthermore, if a plurality of files are processed in parallel (multi-stream processing), a value obtained by dividing the count value of the search counter 28 by the number of files, which are targets of the parallel processing, is subtracted from each cache operation point 502; and the values of the cache operation points 502 in all the pieces of cache information 500 are updated based on each subtraction result.

If the plurality of files are processed in parallel under the above-described circumstance, the CPU 22 executes the redundancy judgment processing on each chunk constituting each file; stores the number of times of execution of the redundancy judgment processing on each file; divides the stored total number of times of execution of the redundancy judgment processing by the number of files which are the targets of the parallel processing; calculates the cache operation point 502 for each file, which is a difference between the number of redundancies of a group, to which each chunk belongs, and the value obtained by the division; selects the minimum value Y from each of the calculated cache operation points 502; and judges, for each file, whether or not the number of redundancies of a group to which each chunk belongs is more than the selected minimum value Y.

In this case, it is possible to find the minimum value Y of the updated cache operation point for each of the files processed in parallel and also select the chunk group information 504, which should be the target to be destaged, for each file.

Furthermore, when executing the data write processing, for example, during the process of storing a plurality of chunks constituting an access target file as write data in the storage apparatus 18, the CPU 22 can temporarily store each chunk in the second area 34 of the cache memory 30; and then execute the chunk storage processing for storing each chunk, which is stored in the second area 34, in the chunk storage area 46 of the storage apparatus 18. Under this circumstance, the chunk can be deleted from the second area 34 when the chunk storage processing on each chunk stored in the second area 34 terminates; or each chunk stored in the second area 34 can be retained for a certain period of time and then deleted from the second area 34.

Figure 14:
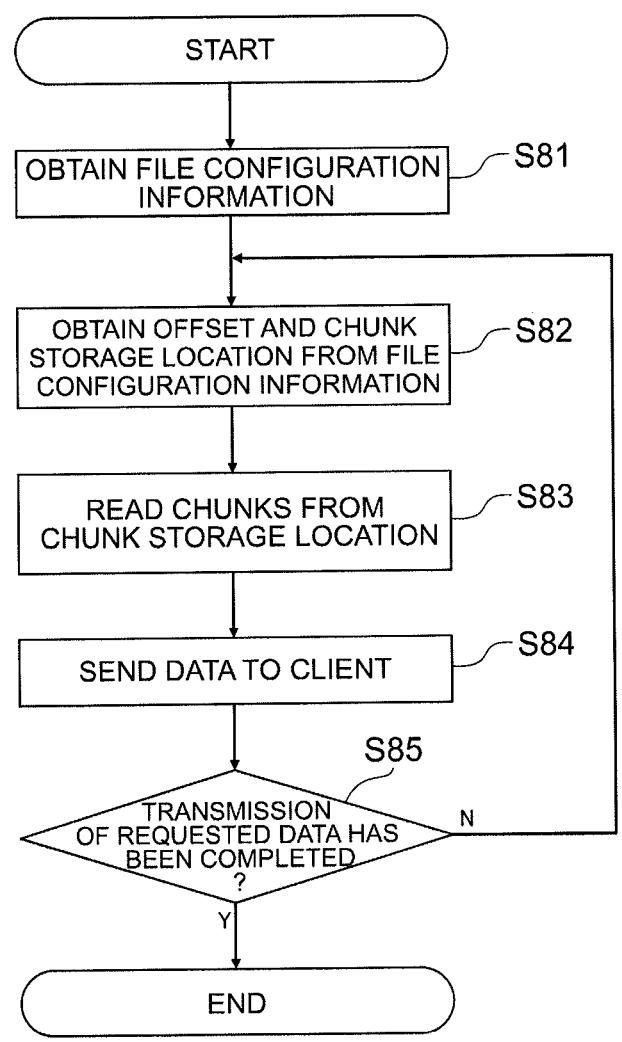
FIG. 14 is a flowchart explaining data read processing.

Next, the data read processing will be explained with reference to the flowchart in FIG. 14.

This processing is started when the CPU 22 receives a read access request as an access request from the client 10.

Firstly, when receiving the read access request from the client 10, the CPU 22 obtains the file configuration information 100 from the storage apparatus 18 (S81). When the read access request is made to read data from the top of a file, the CPU 22 refers to the offset 102 and the chunk storage location 104 of the file configuration information 100 sequentially from the top (entry 110) and obtains the offset 102 and the chunk storage location 104 (S82).

Next, the CPU 22 reads a chunk stored in each chunk storage location 104 based on the obtained chunk storage location 104 (S83); sends data of each read chunk to the client 10 (S84); and judges whether all the pieces of data requested by the file read request have been sent to the client 10 or not (S85).

If it is determined in step S85 that the CPU 22 has not sent all the pieces of data requested by the read access request to the client 10, the CPU 22 returns to the processing of step S82 and repeats the processing of step S82 to step S85; and if it is determined that all the pieces of data requested by the file read request have been sent to the client 10, the CPU 22 terminates the processing in this routine.

Incidentally, if the read access request is made to read data from the middle of a file, the CPU 22 sequentially refers to the offset 102 and the chunk storage location 104 of the file configuration information 100; obtains the offset 102 and the chunk storage location 104 corresponding to the range requested by the read access request based on the above reference result; reads a chunk stored in each chunk storage location 104 based on the obtained offset 102 and chunk storage location 104; and sends data of each read chunk to the client 10.

Furthermore, when executing the data read processing, for example, during the process of reading a plurality of chunks constituting an access target file as read data from the storage apparatus 18, the CPU 22 can temporarily store each chunk, which has been read from the storage apparatus 18, in the second area 34 of the cache memory 30; and then execute the chunk read processing for storing each chunk, which is stored in the second area 34, as the read data to the client 10. Under this circumstance, each chunk can be deleted from the second area 34 when the chunk read processing on each chunk stored in the second area 34 terminates; or each chunk stored in the second area 34 can be retained for a certain period of time and then deleted from the second area 34.

Since the redundancy elimination for eliminating redundant storage of the same chunk(s), from among a plurality of chunks constituting files, in the storage apparatus 18 according to this embodiment, the cache memory 30 can be utilized effectively.

Moreover, since a plurality of chunks constituting files are managed on a group basis according to this embodiment, the chunk redundancy judgment processing can be executed promptly on chunks belonging to each group.

Furthermore, if the first area 32 in the cache memory 30 becomes full, the chunk group information of a target to be destaged is destaged according to this embodiment, so that the first area 32 can be utilized effectively.

Incidentally, the present invention is not limited to the aforementioned embodiments, and includes various variations. For example, the aforementioned embodiments have been described in detail in order to explain the invention in an easily comprehensible manner and are not necessarily limited to those having all the configurations explained above. Furthermore, part of the configuration of an embodiment can be deleted, or added to, or replaced with, the configuration of another configuration.

Furthermore, part or all of the aforementioned configurations, functions, and so on may be realized by hardware by, for example, designing them in integrated circuits. Also, each of the aforementioned configurations, functions, and so on may be realized by software by processors interpreting and executing programs for realizing each of the functions. Information such as programs, tables, and files for realizing each of the functions may be recorded and retained in memories, storage devices such as hard disks and SSDs (Solid State Drives), or storage media such as IC (Integrated Circuit) cards, SD (Secure Digital) memory cards, and DVDs (Digital Versatile Discs).

REFERENCE SIGNS LIST

10 Client terminal (client)
12 Network
14 Storage system
16 File server
18 Storage apparatus
22 CPU
24 Memory
26 Redundancy elimination program
28 Search counter
30 Cache memory 32 First area
34 Second area
36 Cache information storage area
38 Data storage area
40 File configuration information storage area
42 Chunk index information storage area
44 Chunk group information storage area
46 Chunk storage area
100 File configuration information
200 Chunk index information
300 Chunk group information
400 Chunk information
500 Cache information
502 Cache operation point
504 Chunk group information

The invention claimed is:

1. A storage system comprising a cache memory having a first area and a second area, the first area being managed as a storage area for storing cache information used for chunk redundancy elimination processing or data redundancy elimination processing and the second area being managed as a storage area for storing data, a storage apparatus for storing data and information for managing the data, and a controller for controlling I/O processing on the cache memory or the storage apparatus based on an access request from an access requestor, wherein when receiving a write access request from the access requestor, the controller divides a data group constituting a data block, which is an access target, into a plurality of data sub-blocks, manages each data sub-block as a chunk, searches the first area first and then the storage apparatus based on each chunk, and judges whether or not chunk storage information, indicating that each chunk is stored in the storage apparatus, exists in the first area or the storage apparatus; and if a negative result is obtained for the judgment, the controller executes chunk storage processing for storing each chunk in the storage apparatus, creates the chunk storage information indicating that each chunk is stored in the storage apparatus, and stores it in the storage apparatus; and if an affirmative result is obtained for the judgment, the controller eliminates the chunk storage processing for storing each chunk in the storage apparatus; and if the chunk storage information does not exist in the first area, the controller stages the chunk storage information from the storage apparatus to the first area at least on condition that the first area has an unused area, and wherein when receiving the access request from the access requestor, the controller sorts each chunk into a plurality of groups based on its listed order in the data block, manages the chunks on a group basis, calculates a hash value for identifying each chunk with respect to each chunk belonging to any of the groups, searches the first area first and then the storage apparatus based on each calculated hash value, and judges whether or not chunk group information, in which information indicating that each chunk is stored in the storage apparatus is registered on a group basis, exists in the first area or the storage apparatus; and if a negative result is obtained for the judgment of the first area and an affirmative result is obtained for the judgment of the storage apparatus, the controller calculates a coefficient based on a plurality of elements constituting chunk group information corresponding to the group to which the relevant chunk belongs and a number of redundancies per chunk in relation to a number of data blocks stored in the storage apparatus, wherein the number of redundancies is a number of times each data block refers to each chunk in a chunk group; and if the calculated coefficient is equal to or more than a threshold for judging whether the chunk group information stored in the storage apparatus should be staged to the first area or not, and if an unused area exists in the first area, the controller stages the stored chunk group information, as the chunk storage information, from the storage apparatus to the first area.

2. The storage system according to claim 1, wherein when receiving the access request from the access requestor, the controller sorts each chunk into a plurality of groups based on its listed order in the data block, manages the chunks on a group basis, calculates a hash value for identifying each chunk with respect to each chunk belonging to any of the groups, searches the first area first and then the storage apparatus based on each calculated hash value, and judges whether or not chunk group information, in which information indicating that each chunk is stored in the storage apparatus is registered on a group basis, exists in the first area or the storage apparatus; and if an affirmative result is obtained for the judgment, the controller eliminates the chunk storage processing for storing each chunk in the storage apparatus; and if a negative result is obtained for the judgment, the controller executes the chunk storage processing for storing each chunk in the storage apparatus, storing, in the storage apparatus on the group basis, chunk information including each calculated hash value and location information indicating a chunk storage location of each chunk as information belonging to the chunk group information by associating the chunk information with the group to which each chunk belongs, and manages the chunk group information including the stored chunk information as the chunk storage information.

3. The storage system according to claim 1, wherein when receiving the access request from the access requestor, the controller sorts each chunk into a plurality of groups based on its listed order in the data block, manages the groups on a group basis, stores, on the group basis, the number of redundancies, which indicates a total number of times the data block refers to the chunks belonging to each group, and the number of chunks, which indicates the number of chunks belonging to each group, as a plurality of elements constituting the chunk group information, calculates the number of redundancies per chunk based on the plurality of stored elements, and calculates the coefficient based on a ratio of the calculated number of redundancies per chunk to the number of data blocks stored in the storage apparatus.

4. The storage system according to claim 1, wherein when receiving the access request from the access requestor, the controller sorts each chunk into a plurality of groups based on its listed order in the data block, manages the groups on a group basis, executes redundancy judgment processing for judging whether each chunk exists redundantly or not, on each chunk, stores the number of times of execution of the redundancy judgment processing, and manages the number of redundancies, which indicates a total number of times the data block refers to the chunks belonging to each group, on the group basis; and if the first area is full, the controller calculates a difference between the number of redundancies of each group stored in the first area and the stored number of times of execution of the redundancy judgment processing, as a cache operation point on the group basis, selects a minimum value from among the calculated cache operation points, and judges whether or not the number of redundancies of the group to which each chunk belongs is more than the selected minimum value; and if it is determined that the number of redundancies of the group to which each chunk belongs is more than the selected minimum value, the controller destages the chunk group information in which the selected minimum value is registered, from among the chunk group information existing in the first area, from the first area.

5. The storage system according to claim 4, wherein when the controller destages the chunk group information, in which the selected minimum value is registered, from the first area, it resets the stored number of times of execution of the redundancy judgment processing to 0.

6. The storage system according to claim 4, wherein when processing a plurality of data blocks in parallel, the controller executes the redundancy judgment processing on each chunk constituting each data block, stores the number of times of execution of the redundancy judgment processing on each data block, divides a total value of the stored number of times of execution of the redundancy judgment processing by the number of the data blocks which are targets of the parallel processing, calculates a difference between the number of redundancies of each group stored in the first area and the value obtained by the division and recognizes the calculated difference as the cache operation point for each group, selects a minimum value from among the calculated cache operation points, and judges whether or not the number of redundancies of the group to which each chunk belongs is more than the minimum value.

7. A data processing method for a storage system including a cache memory having a first area and a second area, the first area being managed as a storage area for storing cache information used for chunk redundancy elimination processing or data redundancy elimination processing and the second area being managed as a storage area for storing data, a storage apparatus for storing data and information for managing the data, and a controller for controlling I/O processing on the cache memory or the storage apparatus based on an access request from an access requestor, the data processing method comprising:
a step executed by the controller of, when receiving a write access request from the access requestor, dividing a data group constituting a data block, which is an access target, into a plurality of data sub-blocks, managing each data sub-block as a chunk, searching the first area first and then the storage apparatus based on each chunk, and judging whether or not chunk storage information, indicating that each chunk is stored in the storage apparatus, exists in the first area or the storage apparatus;
a step executed by the controller of, if a negative result is obtained for the judgment, executing chunk storage processing for storing each chunk in the storage apparatus, creating the chunk storage information indicating that each chunk is stored in the storage apparatus, and storing it in the storage apparatus; a step executed by the controller of, if an affirmative result is obtained for the judgment, eliminating the chunk storage processing for storing each chunk in the storage apparatus;
a step executed by the controller of, if the chunk storage information does not exist in the first area, staging the chunk storage information from the storage apparatus to the first area at least on condition that the first area has an unused area;
a step executed by the controller of, when receiving the access request from the access requestor, sorting each chunk into a plurality of groups based on its listed order in the data block, managing the chunks on a group basis, calculating a hash value for identifying each chunk with respect to each chunk belonging to any of the groups, searching the first area first and then the storage apparatus based on each calculated hash value, and judging whether or not chunk group information, in which information indicating that each chunk is stored in the storage apparatus is registered on a group basis, existing in the first area or the storage apparatus; and
a step executed by the controller of, if a negative result is obtained for the judgment of the first area and an affirmative result is obtained for the judgment of the storage apparatus, calculating a coefficient based on a plurality of elements constituting chunk group information corresponding to the group to which the relevant chunk belongs and a number of redundancies per chunk in relation to a number of data blocks stored in the storage apparatus, wherein the number of redundancies is a number of times each data block refers to each chunk in a chunk group: and if the calculated coefficient is equal to or more than a threshold for judging whether the chunk group information stored in the storage apparatus should be staged to the first area or not, and if an unused area exists in the first area, staging the stored chunk group information, as the chunk storage information, from the storage apparatus to the first area.

8. The storage system data processing method according to claim 7, further comprising:
a step executed by the controller of, when receiving the access request from the access requestor, sorting each chunk into a plurality of groups based on its listed order in the data block, managing the chunks on a group basis, calculating a hash value for identifying each chunk with respect to each chunk belonging to any of the groups, searching the first area first and then the storage apparatus based on each calculated hash value, and judging whether or not chunk group information, in which information indicating that each chunk is stored in the storage apparatus is registered on a group basis, exists in the first area or the storage apparatus;
a step executed by the controller of, if an affirmative result is obtained for the judgment, eliminating the chunk storage processing for storing each chunk in the storage apparatus;
a step executed by the controller of, if a negative result is obtained for the judgment, executing the chunk storage processing for storing each chunk in the storage apparatus, storing, in the storage apparatus on the group basis, chunk information including each calculated hash value and location information indicating a chunk storage location of each chunk as information belonging to the chunk group information by associating the chunk information with the group to which each chunk belongs, and managing the chunk group information including the stored chunk information as the chunk storage information.

9. The storage system data processing method according to claim 7, a step executed by the controller of, when receiving the access request from the access requestor, sorting each chunk into a plurality of groups based on its listed order in the data block, and managing the chunks on a group basis;
a step executed by the controller of storing, on the group basis, the number of redundancies, which indicates a total number of times the data block refers to the chunks belonging to each group, and the number of chunks, which indicates the number of chunks belonging to each group, as a plurality of elements constituting the chunk group information, and calculating the number of redundancies per chunk based on the plurality of stored elements; and a step executed by the controller of calculating the coefficient based on a ratio of the calculated number of redundancies per chunk to the number of data blocks stored in the storage apparatus.

10. The storage system data processing method according to claim 7, further comprising:
   a step executed by the controller of, when receiving the access request from the access requestor, sorting each chunk into a plurality of groups based on its listed order in the data block and managing the chunks on a group basis;
   a step executed by the controller of executing redundancy judgment processing for judging whether each chunk exists redundantly or not, on each chunk and storing the number of times of execution of the redundancy judgment processing;
   a step executed by the controller of managing the number of redundancies, which indicates a total number of times the data block refers to the chunks belonging to each group, on the group basis; and
   a step executed by the controller of, if the first area is full, calculating a difference between the number of redundancies of each group stored in the first area and the stored number of times of execution of the redundancy judgment processing, as a cache operation point on the group basis, selecting a minimum value from among the calculated cache operation points, and judging whether or not the number of redundancies of the group to which each chunk belongs is more than the selected minimum value; and
   a step executed by the controller of, if it is determined that the number of redundancies of the group to which each chunk belongs is more than the selected minimum value, destaging the chunk group information in which the selected minimum value is registered, from among the chunk group information existing in the first area, from the first area.

11. The storage system data processing method according to claim 10, further comprising a step executed by the controller of, when destaging the chunk group information, in which the selected minimum value is registered, from the first area, resetting the stored number of times of execution of the redundancy judgment processing to 0.

12. The storage system data processing method according to claim 10, further comprising:
   a step executed by the controller of, when processing a plurality of data blocks in parallel, executing the redundancy judgment processing on each chunk constituting each data block, storing the number of times of execution of the redundancy judgment processing on each data block, and dividing a total value of the stored number of times of execution of the redundancy judgment processing by the number of the data blocks which are targets of the parallel processing;
   a step executed by the controller of calculating a difference between the number of redundancies of each group stored in the first area and the value obtained by the division and recognizes the calculated difference as the cache operation point for each group; and
   a step executed by the controller of selecting a minimum value from among the calculated cache operation points, and judges whether or not the number of redundancies of the group to which each chunk belongs is more than the minimum value.

* * * * *